Figure 1:
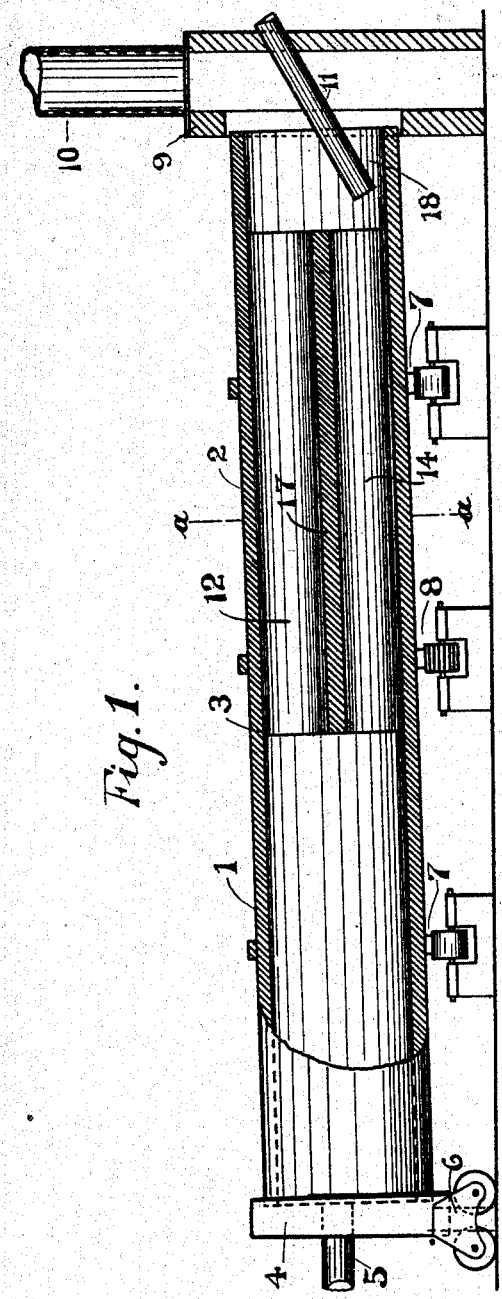

H. L. DOHERTY.
MULTITUBULAR CEMENT KILN.
APPLICATION FILED FEB. 9, 1906.

945,498.

Patented Jan. 4, 1910.

WITNESSES:
M. F. Mangelsdorf
R. W. Jones.

INVENTOR
Henry L. Doherty
BY
Carleton Ellis
ATTORNEY

UNITED STATES PATENT OFFICE.

HENRY L. DOHERTY, OF MADISON, WISCONSIN.

MULTITUBULAR CEMENT-KILN.

945,498.  Specification of Letters Patent.  Patented Jan. 4, 1910.

Application filed February 9, 1906. Serial No. 300,323.

*To all whom it may concern:*

Be it known that I, HENRY L. DOHERTY, a citizen of the United States, and a resident of Madison, in the county of Dane and State of Wisconsin, have invented certain new and useful Improvements in Multitubular Cement-Kilns, of which the following is a specification.

This invention relates to apparatus for burning cement etc., and comprises an inclined rotary kiln of a multitubular construction; all as more fully hereinafter set forth, matters of novelty being particularly pointed out in the appended claims.

Many have been the attempts to secure from the rotary cement kiln a higher efficiency than that ordinarily obtainable. As regards improved kiln construction, probably the most important recent advances have been made in the direction of the lengthened kilns. Formerly, the standard kiln was only sixty feet in length, while modern practice calls for kilns of 90 to 150 ft. in length. The increase in length results in higher heat efficiency and greater output over former practice. Even with this improvement the kiln is far from being an efficient apparatus. The rotary may be described as an open ended barrel set on an incline and so arranged as to propel a thin layer of the cement-forming material or "mix" along its bottom. The diameter of the kiln within linings is usually from five to seven feet. The layer of cement is ordinarily not over 8 to 10 inches in thickness. There is therefore above the material an immense open passage through which the flame may pass. A combustion chamber of such size permits of the stratification of the flame which greatly decreases the efficiency of the fuel employed. This stratification occurs largely in the upper half of the kiln and is due in part to the evolution of great quantities of carbon dioxid from the material in that region.

A kiln having an output of say 400 bbls. cement clinker per day will liberate from the material nearly 700,000 cubic feet of carbon dioxid per day. Practically all this carbon dioxid is evolved before the material reaches the clinkering zone and tests show that the major portion is evolved in the upper half of the kiln. The removal of carbon dioxid involves a heat absorbing or endothermic reaction. Consequently the carbon dioxid when liberated is cool compared to the temperature of the heating flame and gases of combustion. Because of its greater density due to temperature and also to relatively high specific gravity the so evolved carbon dioxid flows along the bottom of the kiln, bathing the material with a cool instead of a hot gas and preventing proper contact of the flame. Apart from the cooling action resulting from this stratification, another and even more serious action occurs which impairs the kiln efficiency. This is a phenomenon dependent on the law of mass action or "phase rule" for explanation. Any reaction evolving a gas is retarded by the presence of that gas in the circumambient atmosphere. Carbon dioxid therefore will retard, or under some circumstances even prevent entirely, the evolution of carbon dioxid from cement material. For highest efficiency the material should be surrounded with an atmosphere containing a minimum of carbon dioxid. This condition it is evident cannot be secured by present practice. It is the object of this invention to perform the operation of calcination or removal of carbon dioxid in apparatus which greatly reduces or prevents the efficiency—impairing stratification above mentioned and which permits the calcination of the material in an atmosphere whose partial pressure of carbon dioxid is relatively low.

By reference to the accompanying drawings it will be seen in what manner my invention is performed.

Figure 3:
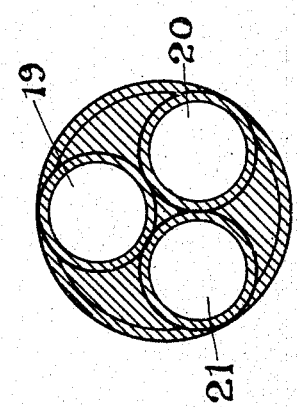
Figure 2:
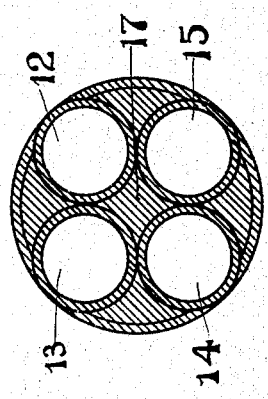

In the drawings, Figure 1 represents a longitudinal section of a cement kiln and Fig. 2 a vertical cross section thereof taken along the line "*aa*" of Fig. 1. Fig. 3 is a cross section of a modified form of the apparatus.

Referring to Fig. 1, the lower portion of the kiln will be seen to have the open or single barrel construction 1. The upper portion of the kiln 2, is of a radically different type and instead of a single barrel is composed of a plurality of small round barrels shown clearly in Fig. 2. This "composite" barrel if it may be so termed, is firmly attached to the large barrel 1 at 3, and the whole structure is arranged to rotate on the bearings 7 by means of the driving mechanism 8, although it is of course possible to have the chamber 1 rotate independently of the composite chamber 2 by mechanism which is obvious to those skilled in the art. Chamber 1 may be designated as the clinkering chamber and the plurality of barrels 2 as the calcining chamber. The ratio of the preferable length of the former to the latter is determined by the area of the clinkering zone.

The calcining zone of the kiln, or the multitubular portion should preferably be at least equal in length to the clinkering zone, or unobstructed portion, and is preferably several times longer, especially where large output and maximum economy of fuel are desired. In a kiln using the customary projected flame of powdered fuel in aerial suspension, the open or unobstructed portion of the kiln should preferably be long enough to allow this flame to reach its full development and produce the maximum of clinkering heat, at a point somewhat in advance of the multitubular portion, as this latter would quickly clog if the material therein were submitted to a clinkering heat. In the calcining zone the kiln walls generally remain without incrustations, while in the clinkering zone, owing to the higher temperature, the kiln lining becomes coated with semi-vitrified incrustation. On this account, the calcining chamber should not be of such length that it is liable to be exposed to the high temperature clinkering zone; as, owing to the small diameter of the barrels composing this chamber, incrustations might form to an obstructive degree at a clinkering temperature. The lower end of the clinkering chamber is closed by the hood 4, in which is situated a chute 6 for discharge of finished clinker and the fuel feed-pipe 5. The latter takes various forms, depending on the fuel employed. Ordinarily the fuel is powdered coal, oil, natural gas or producer gas.
The upper end of the calcining chamber opens into the stack housing and dust chamber 9, on which is situated the stack 10.

11 is a feeding mechanism for introducing the raw material. The calcining chamber as will be seen by reference to Fig. 2 is composed of 4 small cylindrical barrels, (12, 13, 14, and 15) or metal shells lined with firebrick and suitably bound together to rotate as a common structure around the axis 17.
While ordinarily I prefer to use four such chambers, it is possible to make the number greater or less, as say three (shown in Fig. 3) or five (not shown). By the use of properly molded fire-brick, the chambers 12, 13, 14 and 15 may be built as flues in a single cylinder, which form of construction tends to reduce radiation losses.

My apparatus is operated in much the same manner as the ordinary kiln as regards the step of clinkering. In the calcining step, however, the material is divided into four approximately equal streams and is exposed to the flame in a far more thorough manner than in a large single barrel kiln. In each of these smaller round sub-kilns the cement material progresses forward in the same manner as in the larger kiln, but because of their smaller diameter its exposure to the flame gases is much more thorough. At the same time, the material is subjected to thorough agitation and to flame atmospheres constantly varying in their carbon dioxid contents. In the small calcining barrels there is little opportunity for stratification of the gases, hence the material is not bathed in its own evolved gas. Calcination therefore takes place with great ease. The heat absorption is rapid and the gases leave the kiln at a low temperature. With my apparatus, under careful supervision, a greatly increased output of cement clinker may be obtained. The fuel consumption is reduced to a substantial extent.

A great length of kiln is not required with my apparatus as the improved flame action which I secure enables an efficient utilization of the heat even with a short kiln.

My apparatus is so designed that it does not easily become disarranged, hence the troubles such as warping or cracking heretofore experienced with vanes, etc., do not obtain with my apparatus.

By having these upper flues or sub-kilns round, each, in effect, operates in transmitting material therethrough in the same manner as the ordinary rotary inclined kiln. In the structure shown, the whole kiln rotates about its axis and in so doing each of the sub-kilns, though fixed as regards this kiln axis, also, in effect, rotates about its own axis in the sense that any given point in its wall successively becomes upper and lower. The whole kiln being inclined, any given particle of material resting on the bottom of one of these round sub-kilns tends to travel downward therethrough in the same manner as a particle of material in the unobstructed portion of the kiln. By having these sub-kilns of angular section, the same effect would not, of course, be obtained since the material would tend to bank up in the corners instead of traveling forward in the manner desired.

What I claim is:

1. An apparatus for burning cement clinker comprising a single barreled clinkering chamber, means for producing a long flame of burning fuel therein, and a mutiple-barreled calcining chamber comprising a plurality of cylindrical chambers of less diameter than said clinkering chamber, said clinkering chamber being sufficiently long to allow the full development of said flame therein.

2. An apparatus for burning cement clinker comprising an inclined rotatable barrel adapted for clinkering, means for producing a long flame of burning fuel therein, and a plurality of cylindrical conduits of less diameter arranged to rotate with said barrel and adapted to calcination, said barrel being sufficiently long to allow full development of said flame therein.

3. An apparatus for burning cement clinker comprising a single-barreled clinkering chamber and a multiple-barreled calcining chamber comprising a plurality of cylindrical chambers of less diameter than said clinkering chamber, all constructed as an integral structure and arranged to rotate in an inclined position, means for producing a long flame of burning fuel in the clinkering chamber, means for entering raw material into the calcining chamber and means for removing finished clinker from the clinkering chamber, said clinkering chamber being sufficiently long to permit full development of said flame therein.

4. An apparatus for burning cement clinker comprising an inclined rotary kiln provided with means for producing a long flame of burning fuel in the lower portion thereof, said portion being internally open and unobstructed for a distance sufficient to permit full development of said long flame therein while the upper portion beyond the flame chamber is provided with a plurality of round parallel conduits.

5. An apparatus for burning cement clinker comprising a single-barreled clinkering chamber and a calcining chamber containing a plurality of cylindrical chambers of less diameter than said clinkering chamber, the two chambers constructed as an integral structure and arranged to rotate together with said cylindrical chambers in an inclined position, means for producing a long flame of burning fuel in the clinkering chamber, and means for entering raw material into the calcining chamber, said clinkering chamber being sufficiently long to permit full development of said flame therein.

Signed at New York, in the county of New York and State of New York this 6th day of February A. D. 1906.

HENRY L. DOHERTY.

Witnesses:
CARLETON ELLIS,
FLETCHER P. SCOFIELD.